US006847359B1

(12) United States Patent
Ono

(10) Patent No.: US 6,847,359 B1
(45) Date of Patent: Jan. 25, 2005

(54) IMAGE PROCESSING APPARATUS AND IMAGE CAPTURING APPARATUS, WHICH APPROXIMATE OBJECT SHAPES USING A PLURALITY OF POLYGON PATCHES

(75) Inventor: Shuji Ono, Kaisei-Machi (JP)

(73) Assignee: Fuji Photo Film Co., LTD, Kanagawa (JP)

( * ) Notice: Subject to any disclaimer, the term of this patent is extended or adjusted under 35 U.S.C. 154(b) by 244 days.

(21) Appl. No.: 09/685,688

(22) Filed: Oct. 11, 2000

(30) Foreign Application Priority Data

Oct. 14, 1999 (JP) .......................................... 11-291914

(51) Int. Cl.[7] .............................................. G06T 15/00
(52) U.S. Cl. ..................................................... 345/419
(58) Field of Search ................................ 345/441, 646, 345/647, 418–420

(56) References Cited

U.S. PATENT DOCUMENTS 6,249,606 B1 * 6/2001 Kiraly et al. ............... 345/156
6,256,041 B1 * 7/2001 Deering ...................... 345/419
6,307,561 B1 * 10/2001 Doi et al. .................... 345/473
6,385,628 B1 * 5/2002 Massarsky ................... 345/441
6,456,287 B1 * 9/2002 Kamen et al. ............... 345/427

OTHER PUBLICATIONS

T. Kohonen, "The Self–Organizing Map", Proceedings of the IEEE, vol. 78, No. 9, pp. 1464–1480, 1990.

* cited by examiner

Primary Examiner—Mark Zimmerman
Assistant Examiner—Scott Wallace
(74) Attorney, Agent, or Firm—Birch, Stewart, Kolasch & Birch, LLP

(57) ABSTRACT

According to the present invention, an image processing apparatus, that can effectively generate a polygon model approximating a shape of an object by a plurality of polygon patches, includes: an input portion for inputting three-dimensional data of the object of the input points; a storage portion for storing coordinate values of the input points input by the input portion; an update portion for updating three-dimensional coordinate values of a plurality of lattice points of the polygon model so as to reflect a distribution density of the input points, the lattice points being arranged to form lattices on a two-dimensional plane; and an output portion for outputting, as the polygon patches of the polygon model, the three-dimensional coordinate values of the lattice points updated by the update portion and a relationship of connections between the lattice points in the lattices.

14 Claims, 12 Drawing Sheets

POLYGON PATCHES

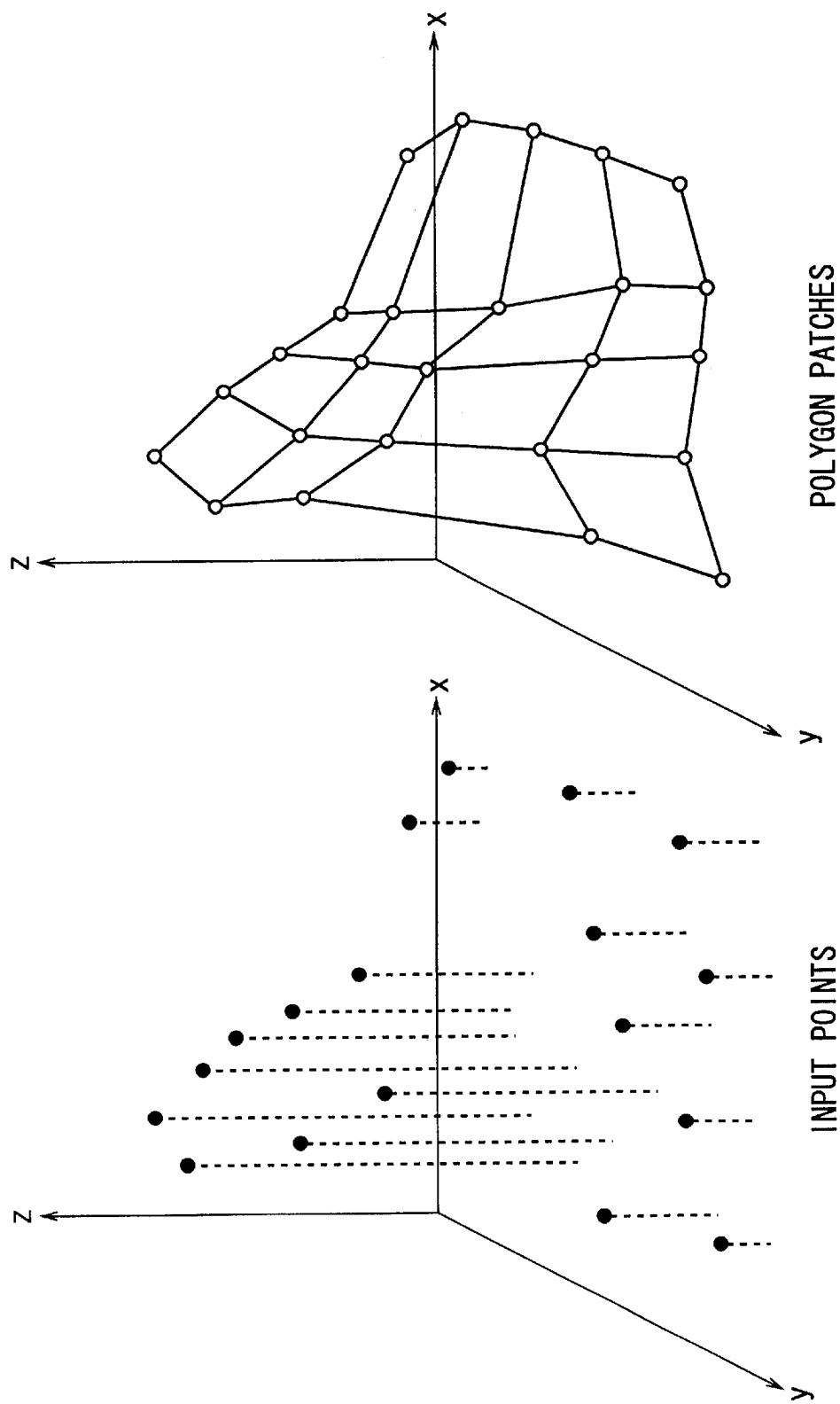

IMAGE PROCESSING APPARATUS AND IMAGE CAPTURING APPARATUS, WHICH APPROXIMATE OBJECT SHAPES USING A PLURALITY OF POLYGON PATCHES

This patent application claims priority based on a Japanese patent application, H11-291914 filed on Oct. 14, 1999, the contents of which are incorporated herein by reference.

BACKGROUND OF THE INVENTION

1. Field of the Invention

The present invention relates to an image processing apparatus, an image capturing apparatus, an image processing method and a recording medium for generating polygon patches. In particular, the present invention relates to an image processing apparatus, an image capturing apparatus, an image processing method and a recording medium for generating a polygon model that approximates a shape of an object by using a plurality of polygon patches.

2. Description of the Related Art

In the fields of survey and computer graphics, a shape of a three-dimensional object is expressed by an approximation as a group of minute polygon patches. A model of the object that is expressed by the polygon patches is called a polygon model. In order to generate the polygon patches, plane data approximating the shape of the object is generated from point data of three-dimensional coordinates of the object. As the plane data, scalene triangle data that expresses the shape of the object using the plane data is often used.

In order to approximate the plane data of the object accurately using the scalene triangle data, it is necessary to satisfy several conditions including, for example, triangles should not cross each other, or the scalene triangle should approximate a regular triangle as close as possible. Such conditions increase the amount of calculation necessary for generating the optimum scalene triangle data, thus significantly increasing the calculation time.

SUMMARY OF THE INVENTION

Therefore, in order to solve the aforementioned problem, it is an object of the present invention to provide an image processing apparatus, an image capturing apparatus, an image processing method, and a recording medium that can effectively generate the polygon patches so as to generate the polygon model of the object. This object is achieved by combinations described in the independent claims. The dependent claims define further advantageous and exemplary combinations of the present invention.

According to the first aspect of the present invention, an image processing apparatus for generating a polygon model that approximates a shape of an object using a plurality of polygon patches, includes: an input portion for inputting three-dimensional coordinate data of the object as input points; a storage portion for storing coordinate values of the input points input by the input portion; an update portion for updating three-dimensional coordinate values of a plurality of lattice points of the polygon model to reflect a distribution density of the input points, the lattice points being arranged to form lattices on a two-dimensional plane and connected to each other; and an output portion for outputting, as the polygon patches of the polygon model, the updated three-dimensional coordinate values of the lattice points and a relationship of connections between the lattice points in the lattices.

The update portion may update the three-dimensional coordinate values of the plurality of lattice points of the polygon model one by one, for each of the input points stored in the storage portion.

The update portion may update the three-dimensional coordinate values of the lattice points by making a three-dimensional coordinate value of a closest lattice point and three-dimensional coordinate values of a plurality of vicinity lattice points closer to a three-dimensional coordinate value of each input point by a predetermined amount, the closest lattice point being closer to the said input point than any other lattice point in the three-dimensional coordinate system, the plurality of vicinity lattice points existing in the vicinity of the closest lattice point in the lattices on the two-dimensional plane.

A range where the vicinity lattice points exist may be made smaller as the number of times the update is performed by the update portion increases. Moreover, the amount by which the three-dimensional coordinate value of each of the vicinity lattice points is updated may be made smaller as a distance from said vicinity lattice point to the closest lattice point is increased.

The lattice points of the polygon model may be arranged to form quadrangular lattices on the two-dimensional plane. In addition, each of the quadrangular polygon patches may be divided into two triangular polygon patches by setting a diagonal connecting two of the four connected lattice points obtained by the update portion, the two lattice points not being adjacent to each other. Moreover, the lattice points of the polygon model maybe arranged to form triangular lattices on the two-dimensional plane.

The output portion may display the polygon model based on the polygon patches, and a manipulator may be further provided to modify and/or transform the polygon model displayed by the output portion.

According to the second aspect of the present invention, an image capturing apparatus for obtaining information regarding depths of an object and outputting a polygon model of the object, includes: a capture portion for capturing an image of the object; a depth calculator for calculating the information regarding the depths of the object from the image captured by the capture portion, to output three-dimensional coordinate data of the object; a storage portion for storing as coordinate values of input points the three-dimensional coordinate data output by the depth calculator; an update portion for updating three-dimensional coordinate values of a plurality of lattice points of the polygon model to reflect a distribution density of the input points, the lattice points being arranged to form lattices on a two-dimensional plane and connected to each other; and an output portion for outputting as polygon patches of the polygon model the three-dimensional coordinate values of the lattice points updated by the update portion and a relationship of connections between the lattice points in the lattices.

A direction from which the object is seen may be perpendicular to the two-dimensional plane on which the lattices are arranged. In addition, values that are substantially equal to coordinate values of the input points in the direction from which the object is seen, respectively, may be used as initial coordinate values in the direction perpendicular to the two-dimensional plane on which the lattices are arranged.

According to the third aspect of the present invention, a computer-readable recording medium storing a program for generating a polygon model that approximates a shape of an object by a plurality of polygon patches is provided. The program stored therein includes: an input module for making three-dimensional coordinate data of an object be input as input points; a storage module for making values of the input points input by the input module be stored; an update module for updating three-dimensional coordinate values of a plurality of lattice points of the polygon model to reflect a distribution density of the input points, the lattice points being arranged to form lattices on a two-dimensional plane; and an output module for outputting the three-dimensional coordinate values of the lattice points updated by the update module and a relationship of connections between the lattice points in the lattices as the polygon patches of the polygon model.

This summary of the invention does not necessarily describe all necessary features so that the invention may also be a sub-combination of these described features.

BRIEF DESCRIPTION OF THE DRAWINGS

While the specification concludes with claims particularly pointing out and distinctly claiming the subject matter that is regarded as the invention, it is believed that the invention, the objects, features and advantages thereof will be better understood from the following description taken in connection with the accompanying drawings where:

FIGS. 5A and 5B show an example of a group of input points and a polygon model generated by a self-organizing map;

DETAILED DESCRIPTION OF THE PREFERRED EMBODIMENTS

The invention will now be described based on preferred embodiments, which do not intend to limit the scope of the present invention, but rather to exemplify the invention. All of the features and the combinations thereof described in the embodiments are not necessarily essential to the invention.

(Embodiment 1)

Figure 1:
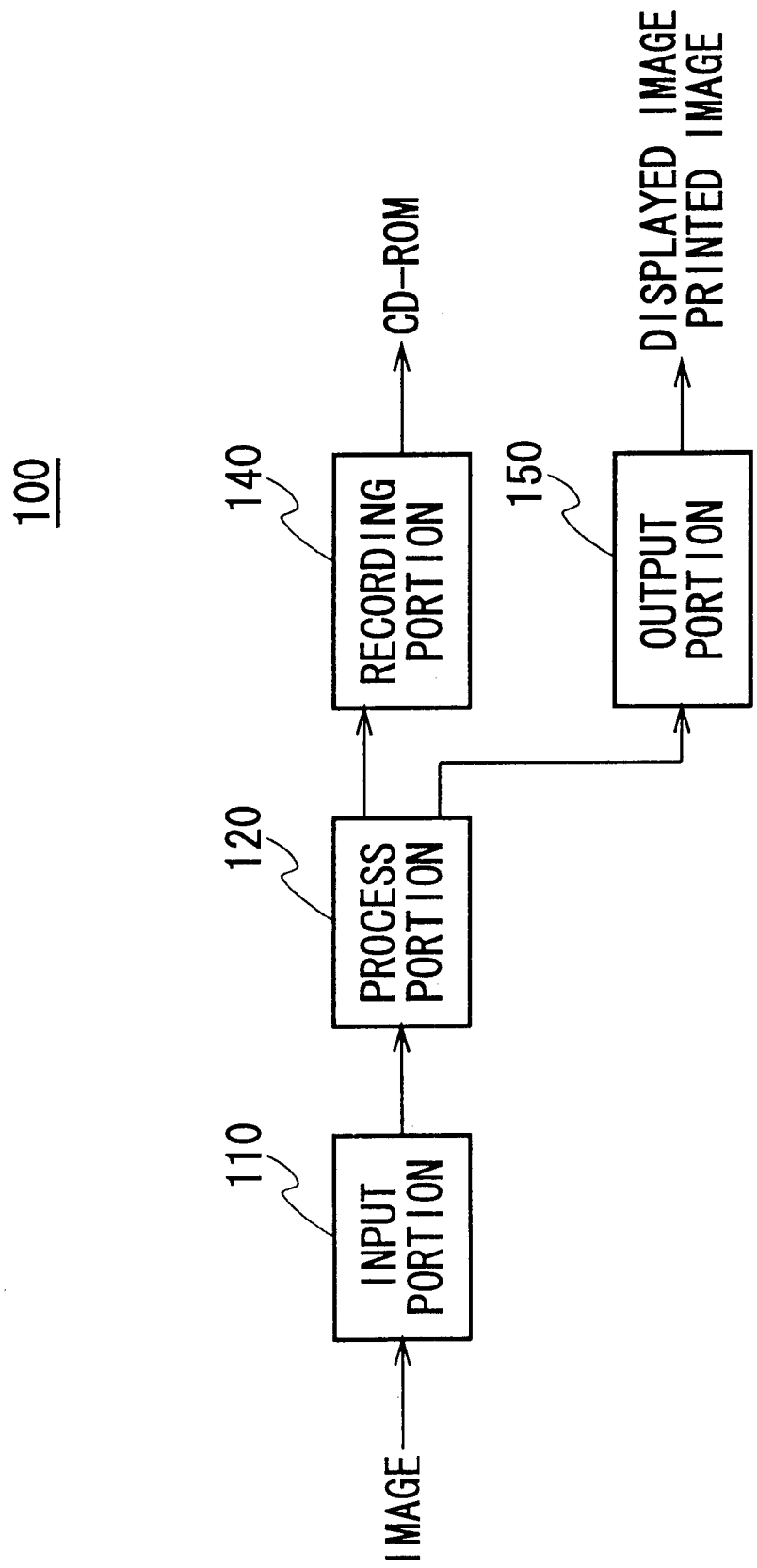
FIG. 1 is a block diagram schematically showing a structure of a lab system for developing or editing photographs as an example of an image process apparatus according to an embodiment of the present invention.

The first embodiment of the present invention is described in detail below. FIG. 1 shows a structure of a lab system used for developing, editing or performing other processes to a photograph, as an example of an image processing apparatus according to the present embodiment. The image processing apparatus 100 in the present embodiment includes an input portion 110, a process portion 120, a recording portion 140 and an output portion 150.

The input portion 110 inputs image data of an object to the image processing apparatus 100. The image data is a two-dimensional image of the object as seen from a certain viewpoint and depth. Information regarding depths of points of the object that respectively correspond to pixels of the two-dimensional image may be input. Alternatively, the two-dimensional image of the object and the three-dimensional coordinate values of the points of the object respectively corresponding to the pixels included in the two-dimensional image, may be input as the image data.

In a case where a digital image of the object taken by a digital camera or the like is input to the image processing apparatus 100, a reading device for reading from a removable recording medium such as a semiconductor memory card the image data and the depth information, or the three-dimensional coordinate values, is used as the input portion 100. In another case where the image data is read from an MO, a CD-ROM or the like, a floppy disk drive, or an MO drive, a CD drive or the like can be used as the input portion 110.

The process portion 120 stores the image data of the object input by the input portion 110 and generates a polygon model obtained by approximation of the shape of the object using polygon patches. A method for generating the polygon model is described later. The process portion 120 outputs the generated polygon model to the recording portion 140 and the output portion 150.

The recording portion 140 records the polygon model output from the process portion 120 into a removable recording medium. The recording medium can be a writable recording medium, for example, an optical recording medium such as a CD-ROM or a DVD, a magneto-optical recording medium such as an MO, or a magnetic recording medium such a floppy disk. A CD-R drive, a DVD drive, an MO drive, a floppy disk drive or the like is used as the recording portion 140. Alternatively, the recording portion 140 may record the polygon model onto a semiconductor memory such as a flash memory or memory card.

The output portion 150 outputs the polygon model from the process portion 120 as an image. For example, in a case of displaying the image on a screen, a monitor for displaying the image is used as the output portion 150. In another case where the image is printed, a printer such as a digital printer or a laser printer is used as the output portion 150.

Figure 2:
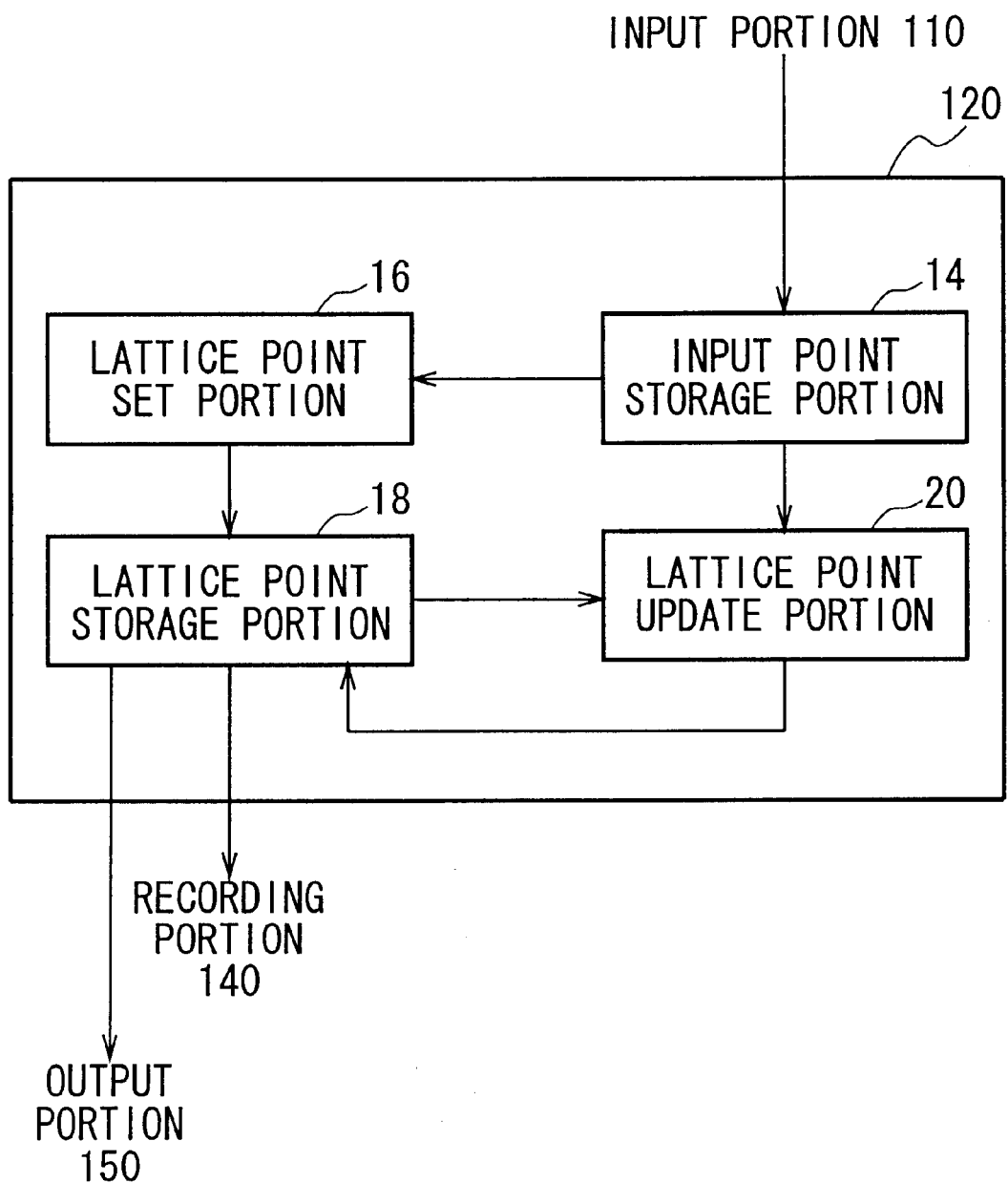
FIG. 2 is a functional block diagram of a process portion 120.

FIG. 2 is a functional block diagram of the process portion 120. The process portion 120 includes an input point storage portion 14, a lattice point set portion 16, a lattice point storage portion 18 and a lattice point update portion 20.

The input point storage portion 14 stores, as input points, the image data of the object input by the input portion 110, especially three-dimensional coordinate values of the respective points of the object, in the semiconductor memory such as a RAM or a magnetic recording medium such as a hard disk. The lattice point set portion 16 sets an initial arrangement of lattice points in the polygon model that approximates the shape of the object and initial coordinate values of the lattice points. The lattice point storage portion 18 stores the arrangement and the coordinate values of the lattice points into a memory or the like. The lattice point update portion 20 updates the coordinate values of the lattice points stored in the lattice point storage portion 18 for each of the input points stored in the input point storage portion 14 one by one. The updated coordinate values of the lattice points are stored in the lattice point storage portion 18. This outputs the arrangement and the coordinate values of the lattice points of the polygon patches in the polygon model to the recording portion 140 and the output portion 150.

A method for updating the lattice points that is conducted by the lattice point update portion 20 is described below. Self-organizing learning, that is unsupervised updating, is employed as the updating method. More specifically, a self-organizing map is used as an example of self-organized learning. According to the self-organizing map, when a group of input points are given in an n-dimensional input space (n is a natural number), output points in an n-dimensional output space are arranged in an m-dimensional space (m is a natural number) so as to have a certain structure, thus a topological map of the input point group into the output point group is obtained by unsupervised updating.

In the self-organizing map technique, in general, the input points closely adjacent to each other in the n-dimensional input space are mapped into ones of the output points arranged in the m-dimensional space that are closely adjacent to each other. Thus, the phase in the input space is nonlinearly projected into the structure in the m-dimensional space. The self-organizing map is described in detail in T. Kohonen, "The Self-Organizing Map", Proceedings of The IEEE, Vol. 78, No. 9, pp. 1464–1480, 1990 and T. Kohonen, translated by Tokutaka et al., "The Self-Organizing Map", Springer-Verlag Tokyo, 1996.

In the present application, how to apply the self-organizing map to generation of the polygon model of the three-dimensional object is described. In the following description, the three-dimensional coordinate value of each point of the object given as the input to the process portion 120 is called the input point, and an apex of the polygon patch in the polygon model is called a lattice point.

Figure 3B:
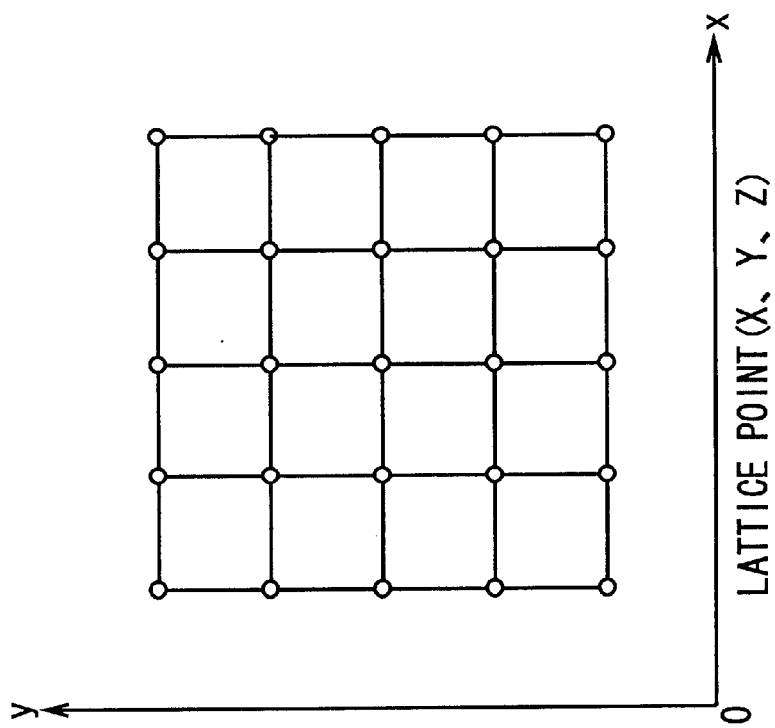
FIGS. 3A and 3B show an example of a distribution of input points and an arrangement of lattice points.
Figure 3A:
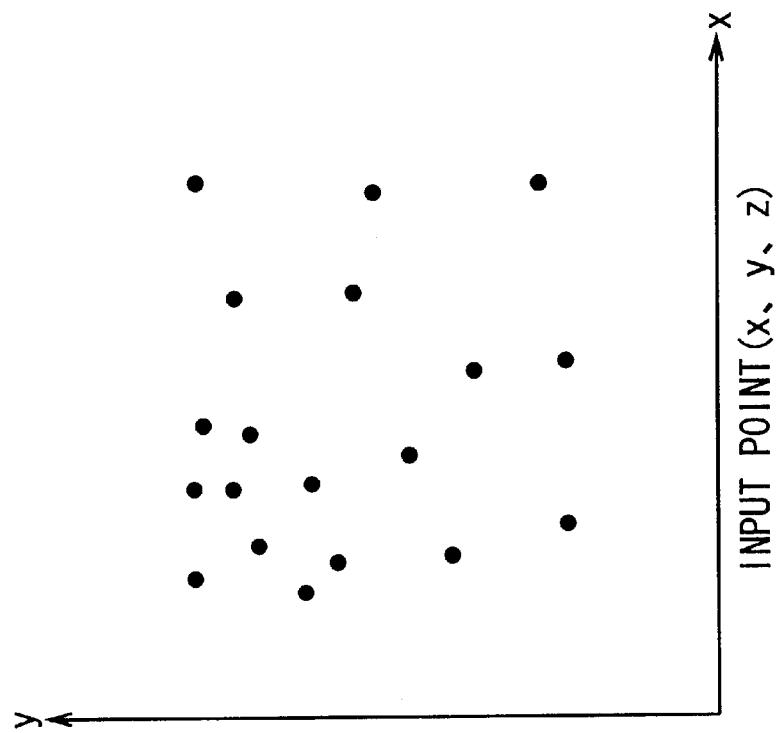

FIGS. 3A and 3B show an example of a distribution of the input points and an arrangement of the lattice points. Each point of the object is expressed as the input point (x, y, z) which exists in a three-dimensional coordinate system. The points of the objects are distributed as shown in FIG. 3A, for example. Please note that FIG. 3A only shows x- and y-coordinates of each point, and does not show a z-coordinate which exists along an axis perpendicular to an x-y plane.

The polygon patch of the polygon model, which approximates the shape of the object, is expressed by connections between the lattice points (X, Y, Z) distributed in the three-dimensional coordinate system x-y-z. At the initial state, the lattice points are arranged to form quadrangular lattices, as shown in FIG. 3B, in which the adjacent lattice points are connected. Each quadrangular lattice constitutes one polygon patch of the polygon model.

The relationship of the connections between the lattice points arranged in the two-dimensional plane shown in FIG. 3B is called a two-dimensional map. "Vicinity" of the lattice point, described later, is defined by a positional relationship between the lattice points in the two-dimensional map. The coordinate value of the lattice point is defined in the x-y-z coordinate system, and a distance from the input point is defined as a distance that is normally defined in the x-y-z coordinate system. On the other hand, the "vicinity" of the lattice points is defined by the positional relationship of the lattice points in the two-dimensional map. The above-described self-organizing map in which the lattice points having the three dimensional coordinates are connected in the two-dimensional plane is called a two-dimensional network having three inputs.

At the initial state before the self-organizing learning, the z-coordinate value of each lattice point may be a value close to 0 or a random value. Moreover, in order to obtain excellent convergence of the self-organizing learning, the z-coordinate value of the lattice point at the initial state may be a value close to an averaged value of the z-coordinate values of the input points of the object, or a value determined in such a manner that the distribution of the z-coordinate values of the lattice points reflects the distribution of the z-coordinate values of the input points of the object.

Figure 4B:
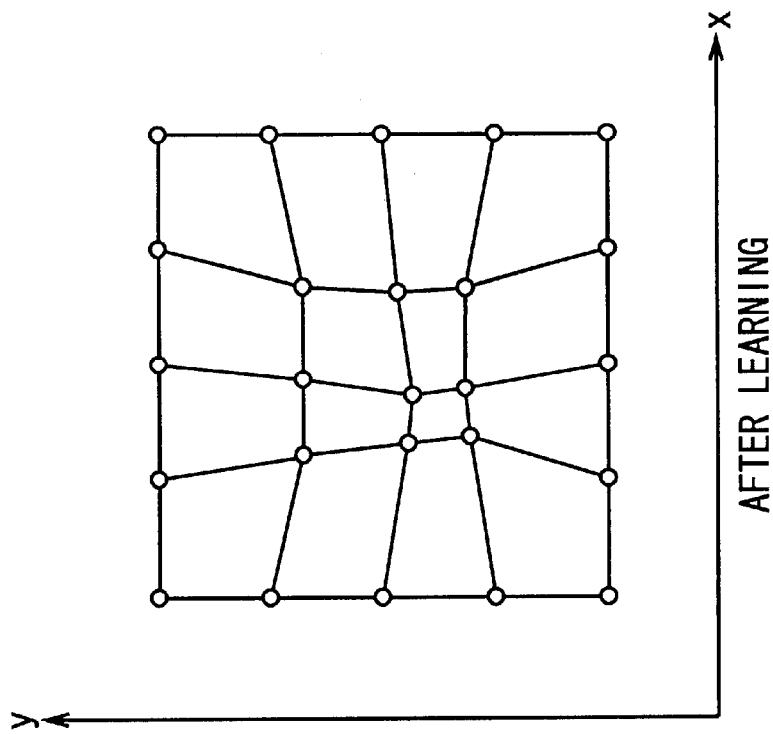
FIGS. 4A and 4B show a manner in which the lattice points are updated.
Figure 4A:
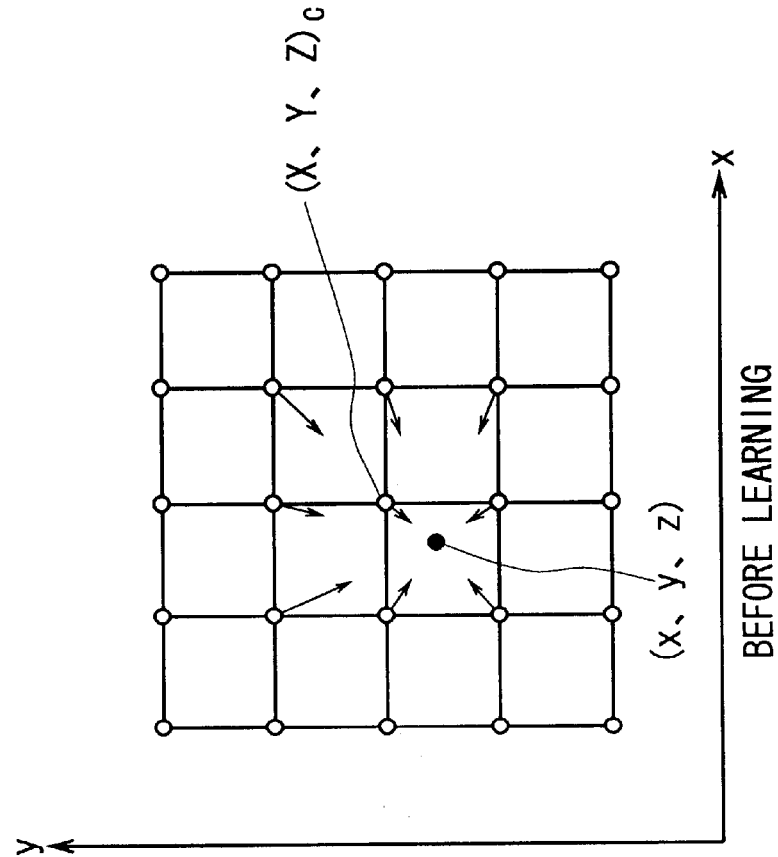

FIGS. 4A and 4B show how the lattice points are successively updated. When one input point X=(x, y, z) stored in the input point storage portion 14 is given, the lattice point update portion 20 selects a lattice point $m_c=(X, Y, Z)_c$ which is the closest lattice point from the input point X=(x, y, z) in the x-y-z coordinate system. In addition, the lattice point update portion 20 selects, as vicinity lattice points that exist in the vicinity of the closest lattice point $m_c$, eight lattice points surrounding the closest lattice point $m_c$, as shown in FIG. 4A. The lattice point update portion 20 updates the coordinate values in the x-y-z coordinate system by a predetermined amount for each of the closest lattice point $m_c$ and vicinity lattice points, so that the closest lattice point $m_c$ and the vicinity lattice points become closer to the input point (x, y, z).

When a group constituted by the closest lattice point $m_c$ and the vicinity lattice points is assumed to be Kc, the coordinate values of the lattice points $m_i$ included in the group Kc are updated one by one in accordance with the following formula.

$$m_i(t+1)=m_i(t)+\alpha(t)\{X(t)-m_i(t)\} \quad (1)$$

In Formula (1), $m_i(t+1)$ and $m_i(t)$ are coordinate values of the lattice point $m_i$ at times (t+1) and t, respectively; X(t) is a coordinate value of an input point given at the time t; and $\alpha(t)$ is a parameter for adjusting a updating speed. It should be noted that $\alpha(t)$ can be made smaller as the time t elapses. For other lattice points that are not included in the group Kc, the coordinate values are not updated. In other words, for the lattice point $m_i$ which does not belong to the group Kc, the following formula is satisfied.

$$m_i(t+1)=m_i(t) \quad (2)$$

FIG. 4B shows a state where the coordinate values of the lattice points included in the group Kc have been updated, thereby the positions of these lattice points become closer to the input point. In FIG. 4B, only the x-y coordinate system is shown and the z-coordinate values are omitted. However, a person skilled in the art would appreciate that the z-coordinate values of the lattice points also become closer to the z-coordinate value of the input point.

The lattice point update portion 20 selects one of the input points stored in the input storage portion 14, selects the closest lattice point which has the shortest distance from the selected input point and the vicinity lattice points in the vicinity of the selected closest lattice point, and then updates the coordinate values of the closest lattice point and the vicinity lattice points one by one in accordance with Formula (1). The updating operation is performed repeatedly for every input point stored in the input point storage portion 14.

It is preferable that the input point for which the updating operation of the lattice points is performed is selected at random. By performing the above-described updating operation repeatedly, the coordinate values of the lattice points are updated to reflect a distribution density of the input points. That is, the coordinate values of the lattice points are updated so that many of the lattice points concentrate in an area where the input points are densely concentrated, whereas only a small number of the lattice points exist in an area where the input points are sparse.

As described above, according to the self-organizing learning, the coordinate values of the lattice points arranged in the two-dimensional map are updated so as to reflect the distribution density of the input points by only giving the input point. In other words, the input points that are close to each other in the x-y-z space are mapped into the lattice points that are positioned close to each other in the two-dimensional map in the form of the lattice, thereby many of the lattice points concentrate in the area where the input points exist densely. Thus, a two-dimensional map reflecting the distribution density of the input points in the three-dimensional space is obtained.

FIGS. 5A and 5B show an example of a group of input points and a polygon model generated by the self-organizing map. More specifically, FIG. 5A shows a distribution of the input points in the x-y-z coordinate system. FIG. 5B shows a distribution of the lattice points updated by the process using the self-organizing map. The lattice points are distributed so as to reflect the distribution density of the input points in the x-y-z coordinate system. As a result, the resultant polygon patches approximate the shape of the object.

Each of the polygon patches of the polygon model thus generated is composed of four lattice points corresponding to four apices of a quadrangle. In some cases, however, the four lattice points do not exist on the same plane. In these cases, the polygon patch is a distorted plane that cannot be constituted by a single plane, causing inconvenience. In order to eliminate this inconvenience, such a distorted polygon patch may be divided into two polygon patches by selecting two of the four lattice points, which are not adjacent to each other, connecting the selected two lattice points, and then dividing the quadrangle on the connection line into two triangles. In this way, a problem in the case where all the four apices of the quadrangular polygon patch do not exist on the same plane can be eliminated.

Figure 6:
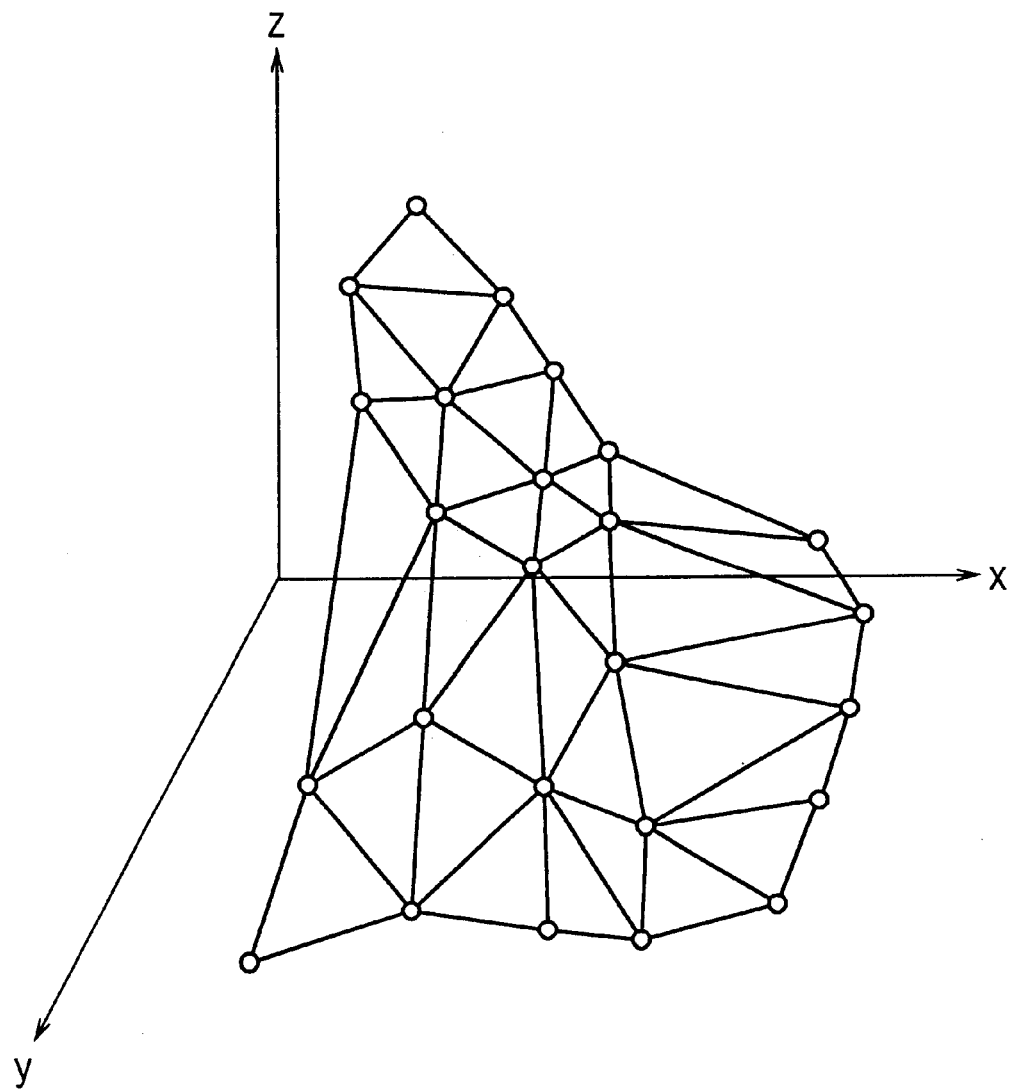
FIG. 6 shows an exemplary polygon model generated by dividing each of the quadrangular polygon patches into two triangular polygon patches.

FIG. 6 shows an exemplary polygon model generated by dividing each quadrangular polygon patch into two triangular polygon patches. All of the quadrangular polygon patches may be divided into the triangular polygon patches as shown in FIG. 6. Alternatively, only the quadrangular polygon patch having four apices that are not included on the same plane may be divided into the triangular polygon patches as described above.

Figure 7B:
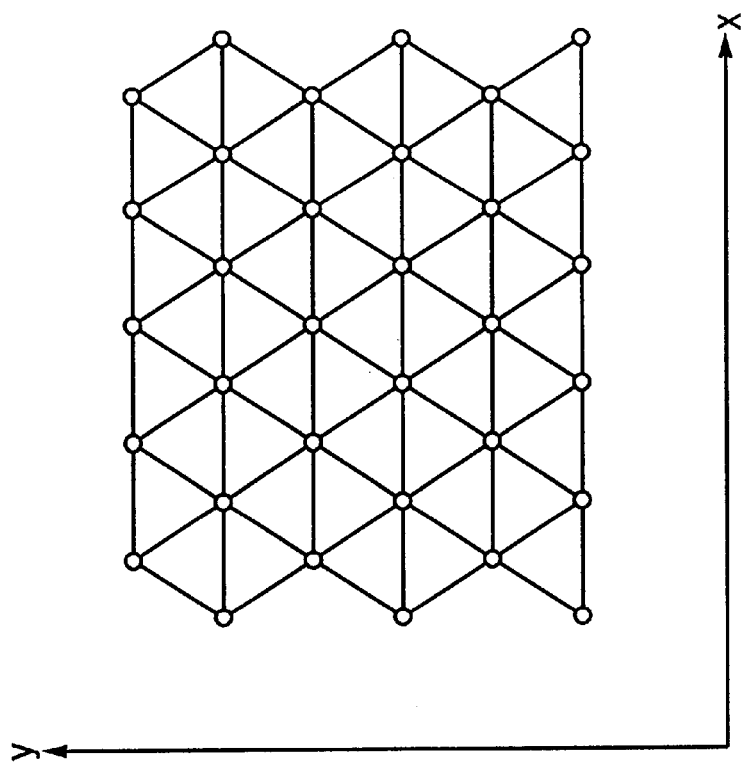
FIGS. 7A and 7B show exemplary arrangements of the lattice points in which the lattice points are arranged to form triangular lattices.
Figure 7A:
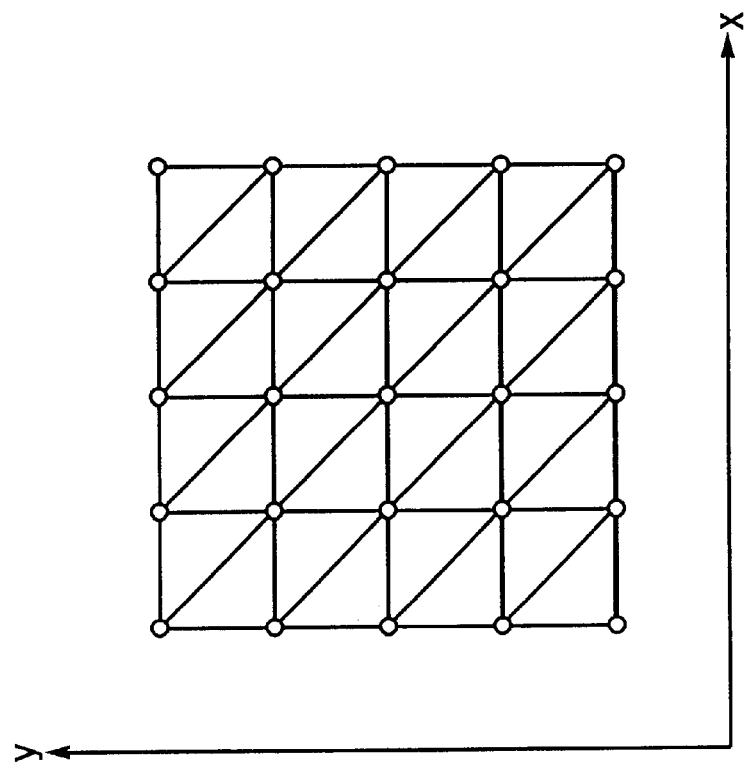

FIGS. 7A and 7B show exemplary arrangements of the lattice points where the lattice points are arranged to form triangular lattices. When the lattice points are arranged at apices of the triangular lattices at the initial state, each of the polygon patches of the polygon model generated by updating using the self-organizing map also has a triangular shape. Thus, in this case, a problem of distortion of the plane of the polygon patch that may arise in the case when the quadrangular lattice is used cannot arise.

In FIG. 7A, the triangular lattices are generated by connecting the lattice points that are arranged to form quadrangular lattices, not only in horizontal and vertical directions but also in a diagonal direction. In this example, the upper-left lattice point and the lower-right lattice point are connected in each quadrangular lattice. However, the upper-right lattice point and the lower-left lattice point may be connected to each other. In addition, either of two diagonal directions may be selected for each quadrangular lattice so as to allow the diagonals having different directions to exist.

In FIG. 7B, the triangular lattices are arranged to form hexagonal lattices. In a case where the lattice points are arranged to form hexagonal lattices, as shown in FIG. 7B, when a certain lattice point is selected, a plurality of lattice points which are positioned at an equal distance from the selected lattice point in the two-dimensional map can be easily determined. Thus, the "vicinity" of the closest lattice point in the self-organizing learning can be easily defined, thereby simplifying an algorithm of calculation in the self-organizing learning.

In the above description of the self-organizing learning, the vicinity lattice points are defined as lattice points existing within a predetermined distance from the closest lattice point in the two-dimensional map, and the coordinate values of both the closest lattice point and the vicinity lattice points thus defined are updated in accordance with Formula (1). Alternatively, the updating amount may be increased for the vicinity lattice points that are closer to the closest lattice points, while the updating amount may be reduced for other vicinity lattice points that are distant from the closest lattice point. More generally, when a distance from the closest lattice point $m_c$ to the vicinity lattice point $m_i$ in the two-dimensional map is assumed to be $r_{ci}$, a vicinity function $h_{ci}(t)$ may be defined as follows.

$$h_{ci}(t) = \alpha(t) \exp\{-r_{ci}^2/2\sigma^2(t)\} \quad (3)$$

In Formula (3), $\alpha(t)$ is the parameter for adjusting the updating speed and $\sigma(t)$ is a parameter for adjusting a size of the vicinity. Both of the parameters may be made smaller as the time t elapses.

Instead of using Formulae (1) and (2), the coordinate values of all the lattice points $m_i$ may be updated using the vicinity function $h_{ci}(t)$ in accordance with the following formula.

$$m_i(t+1) = m_i(t) + h_{ci}(t)\{X(t) - m_i(t)\} \quad (4)$$

According to Formula (3), the amount by which the lattice point in the vicinity of the closest lattice point $m_c$ becomes closer to the input point $X(t)$ is smaller, as it is farther from the closest lattice point $m_c$.

Figure 8:
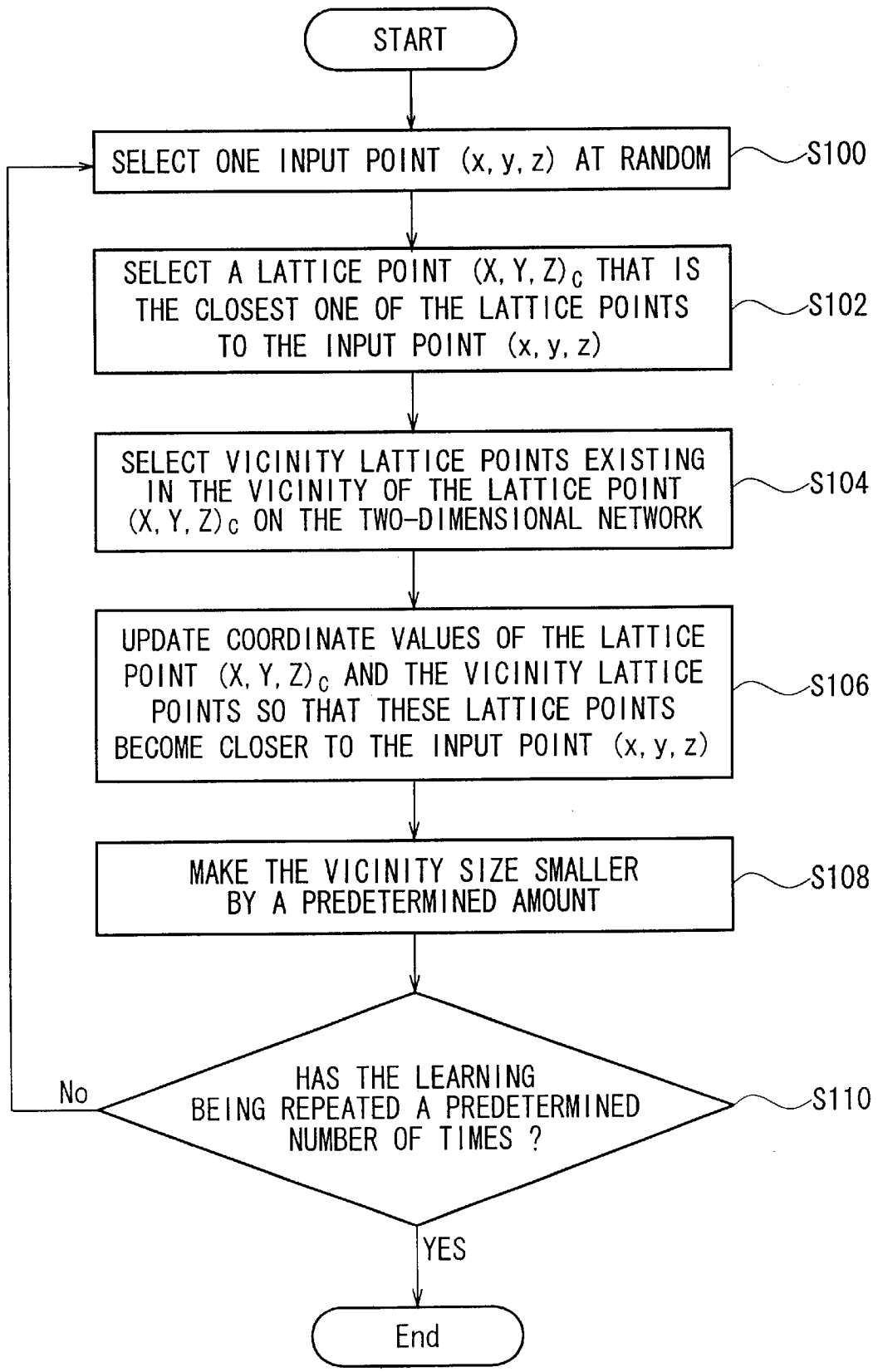
FIG. 8 is a flowchart of self-organizing learning performed by the lattice point update portion 20.

FIG. 8 is a flowchart of the self-organizing learning performed by the lattice point update portion 20. First, one (x, y, z) of the input points stored in the input point storage portion 14 is selected at random (Step S100). One of the lattice points stored in the lattice point storage portion 18 that is closest from the input point (x, y, z) is selected as the closest latticed point $(X, Y, Z)_c$ (Step S102) The lattice points existing in the vicinity of the lattice point $(X, Y, Z)_c$ in the two-dimensional map are selected based on a predetermined vicinity size (Step S104). The vicinity size may be established by determining a range of selection of the lattice points existing in the surrounding area of the closest lattice point in the two-dimensional map or by using the vicinity function $h_{ci}(t)$ expressed by Formula (3).

The coordinate values of the lattice point $(X, Y, Z)_c$ and the lattice points existing in the vicinity thereof are updated so that the lattice point $(X, Y, Z)_c$ and the vicinity lattice points become closer to the input point (x, y, z) (Step S106). The coordinate values are updated based on Formula (1) or (4). The vicinity size is then made smaller by a predetermined amount (Step S108). The vicinity size may be adjusted by changing the selection range of the lattice points existing in the surrounding area of the closest lattice point on the two-dimensional map or by using the vicinity function $h_{cf}(t)$ expressed by Formula (3).

A counter for counting the number of updating times is then increased by one, and it is determined whether or not the updating was performed a predetermined number of times (Step S110). When it is established that the updating has been performed a predetermined number of times, the self-organizing learning operation is finished. If not, the flow goes back to Step S100 and the procedure from Step S100 is repeated.

As described above, according to the image processing apparatus in the present embodiment, the polygon model that approximates the shape of the object using the polygon patches can be easily generated by inputting the image data and the depth information of the object and then performing the self-organizing learning. Since self-organizing learning has an advantageous effect of smoothing data, the polygon model of the object can be generated without being greatly effected by noise or an error, even if the image data of the object includes noise, or the depth information has an accuracy problem.

(Embodiment 2)

The second embodiment of the present invention is described in detail below. An image processing apparatus in the present embodiment is different from that in the first embodiment but only with regard to the structure process portion 120. Therefore, the description for components commonly used in the first and second embodiments is omitted and only different components are described.

Although the input portion 110 inputs the two-dimensional image data of the object and the depth values of the respective pixels as the image data in the first embodiment, the input portion 110 of the image processing apparatus in the present embodiment inputs only parallax image data of the object. The process portion 120 obtains the depth information by calculation from the parallax image data so as to obtain three-dimensional coordinate data of the object.

Figure 9:
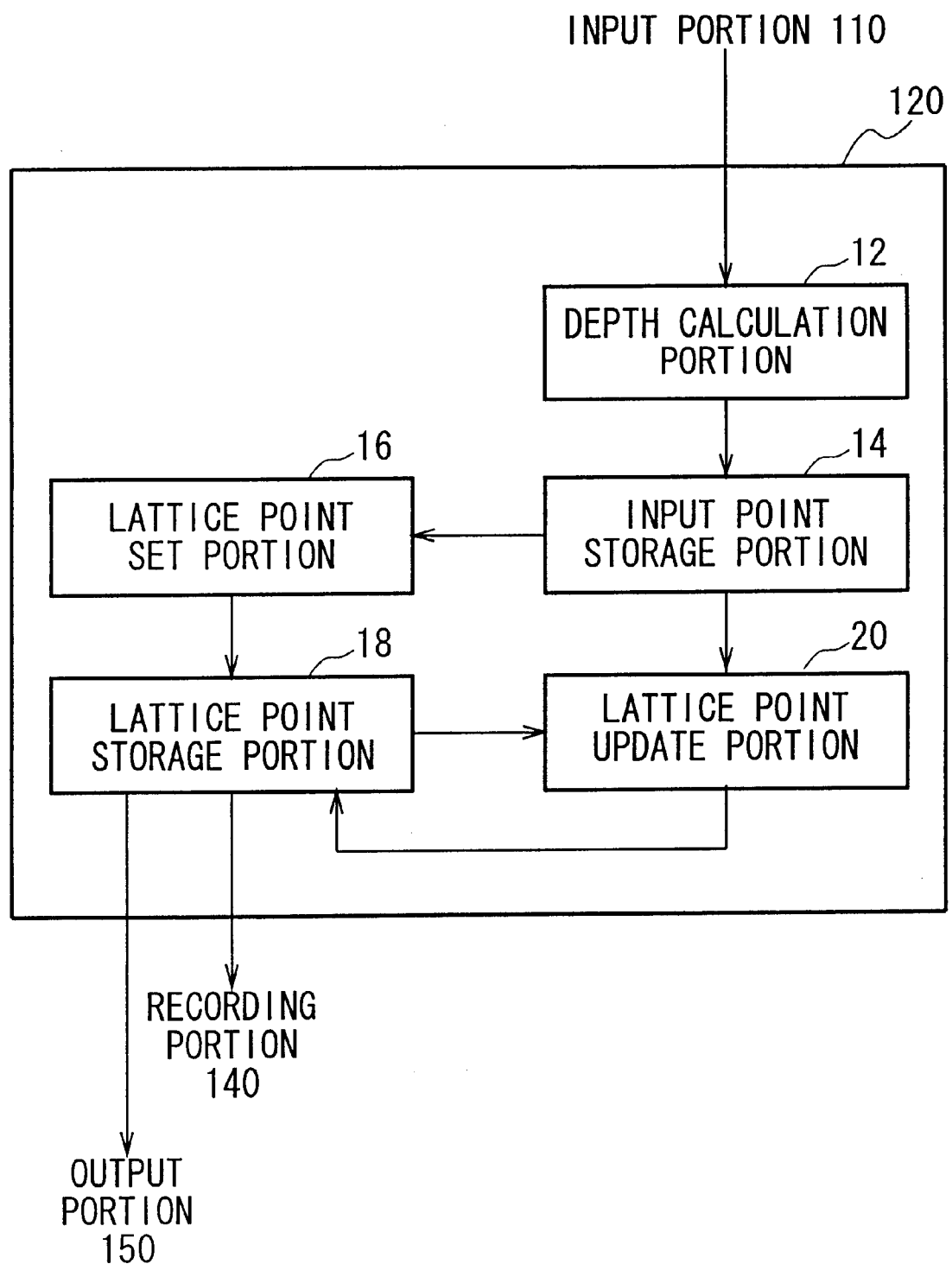
FIG. 9 is a functional block diagram of the process portion 120.

FIG. 9 is a functional block diagram of the process portion 120. The process portion 120 includes a depth calculation portion 12, an input point storage portion 14, a lattice point set portion 16, a lattice point storage portion 18 and a lattice point update portion 20.

The depth calculation portion 12 calculates the depth information regarding the depth of the points of the object corresponding to the respective pixels of the image, from the parallax image data of the object input by the input portion 110. The parallax images are images of the object seen from different viewpoints. When the parallax images seen from two or more different viewpoints are used, the depth values of the object can be calculated in accordance with a principle of triangulation. The x- and y-coordinate values of each pixel are determined by considering the two-dimensional image of the object as the x-y coordinate plane, and the z-coordinate value is determined from the depth information by considering the depth direction that is perpendicular to the x-y coordinate plane as the z-axis. The depth calculation portion 12 outputs the x-, y- and z-coordinate values of each point of the object thus obtained, to the input point storage portion 14.

The structures and operations of the input point storage portion 14, the lattice point set portion 16, the lattice point storage portion 18 and the lattice point update portion 20 are the same as the components labeled with the same reference numerals of the process portion 120 in the first embodiment, and thus the description thereof is omitted.

According to the image processing apparatus in the present embodiment, the polygon model that approximates the shape of the object can be generated by calculating the depth values of the object from the parallax images of the object and obtaining the three-dimensional coordinate data of the object. The polygon model of the object can therefore be generated from the parallax images even if there is no three-dimensional coordinate data of the object.

(Embodiment 3)

Figure 10:
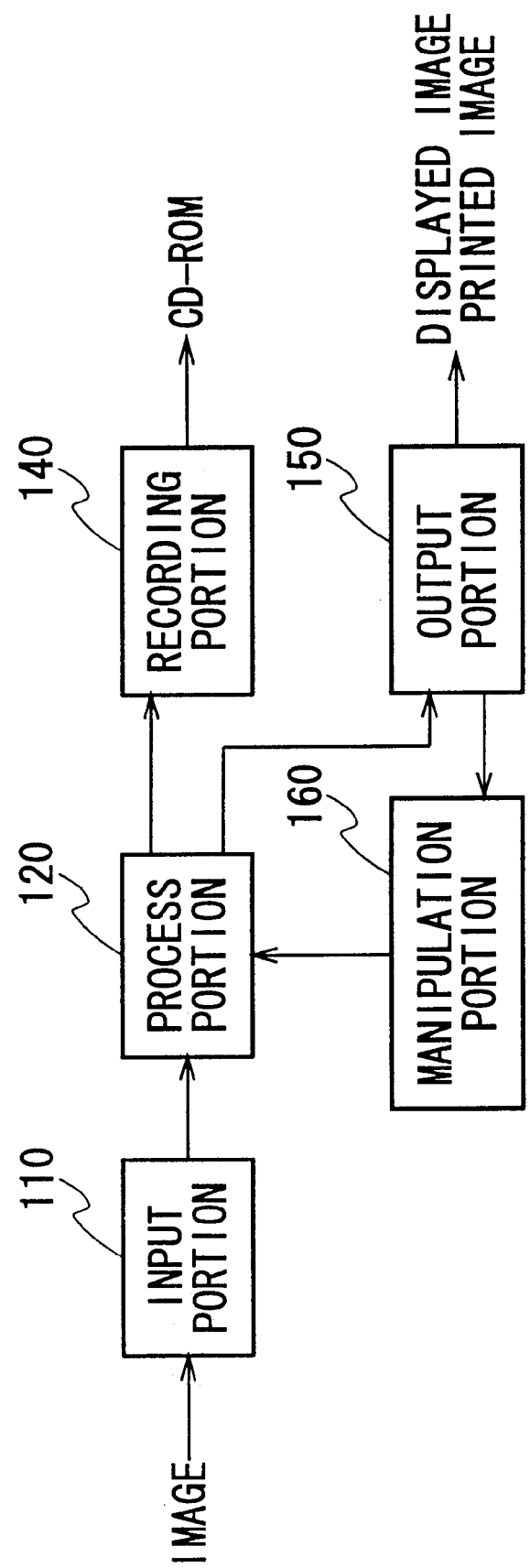
FIG. 10 is a block diagram schematically showing a structure of a lab system for developing or editing photographs as an example of an image processing apparatus according to another embodiment of the present invention.

The third embodiment of the present invention is described in detail below. FIG. 10 is a block diagram schematically showing a structure of a lab system for developing, editing or processing photographs, as an example of an image processing apparatus according to the third embodiment of the present invention. The image processing apparatus 102 in the present embodiment includes an input portion 110, a process portion 120, a recording portion 140, an output portion 150 and a manipulation portion 160.

Components other than the manipulation portion 160 are the same as the components labeled with the same reference numerals included in the image processing apparatuses in the first and second embodiments, and thus a description thereof is omitted. The manipulation portion 160 performs various editing operations for the output of the output portion 150, for example, the displayed image, and outputs an instruction of the manipulation to the process portion 120. More specifically, the manipulation portion 160 manipulates the polygon model of the object to modify, transform, rotate or partially extract the polygon model. The process portion 120 modifies the coordinate values of the lattice points of the polygon model and/or the relationship of the connections between the lattice points based on the instruction of the manipulation from the manipulation portion 160, thereby updating the lattice point data.

According to the image processing apparatus in the present embodiment, the polygon model can be generated by inputting the image data and depth information of the object, resulting in a polygon model that can be manipulated for transformation and/or modification while an image corresponding to the polygon model is displayed on a screen. The polygon model approximating the object may include an unexpected error because of the effect of noise, and accuracy of the updating algorithm or the like. The image processing apparatus in the present embodiment can allow a user to modify and/or edit the generated polygon model, thus the user can adjust an inappropriate part of the polygon model. In addition, a three-dimensional simulation of the object can be performed by rotating the polygon model or extracting a part of the polygon model.

(Embodiment 4)

Figure 11:
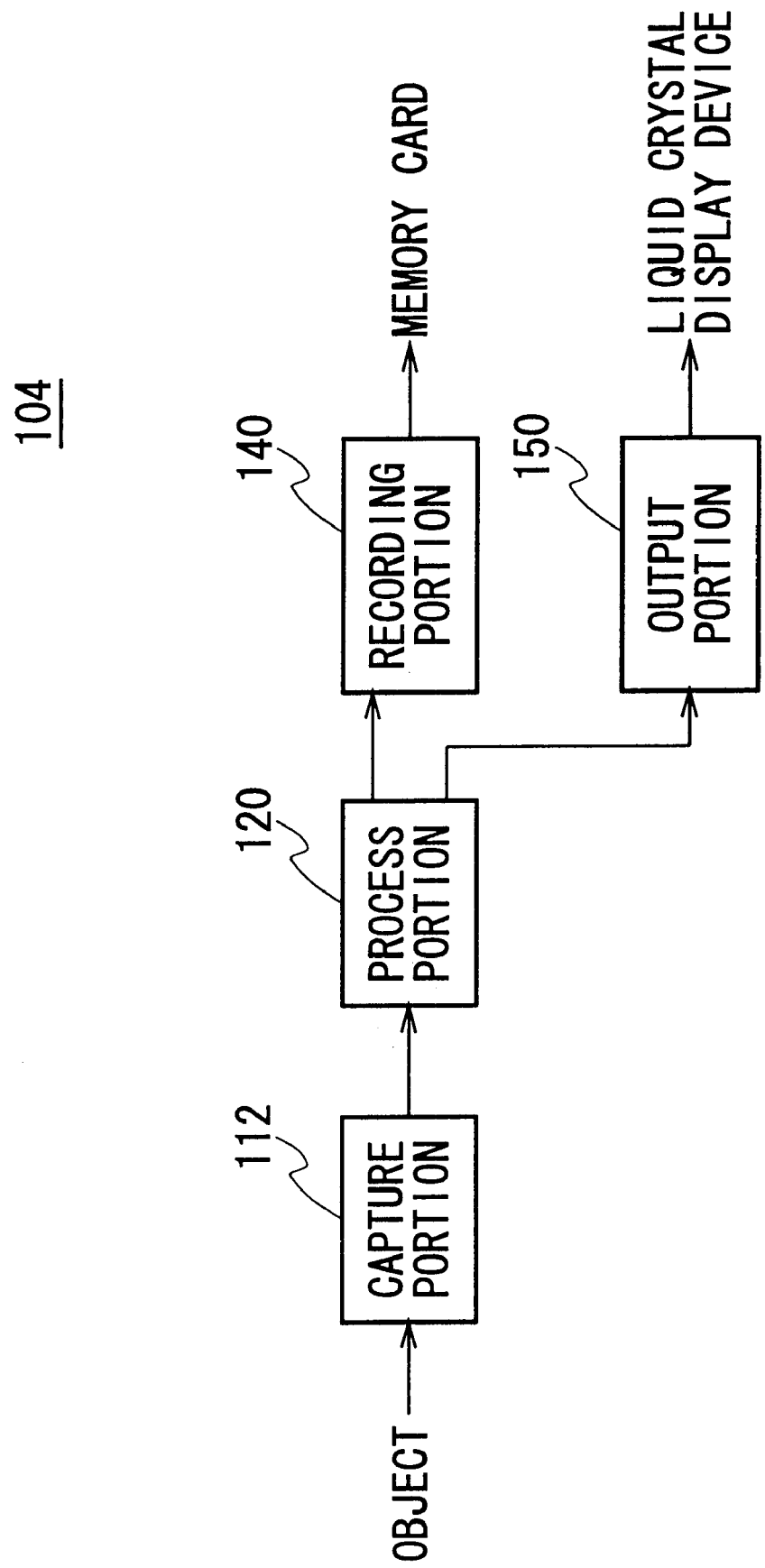
FIG. 11 is a block diagram schematically showing a structure of a digital camera as an example of an image capturing apparatus according to another embodiment of the present invention.

The fourth embodiment of the present invention is described in detail below. FIG. 11 is a block diagram schematically showing a structure of a digital camera as an example of an image capture apparatus, according to the fourth embodiment of the present invention. The digital camera includes a digital still camera, a digital camcorder that can obtain a still image, and the like. The image capture apparatus 104 in the present embodiment includes a capture portion 112, a process portion 120, a recording portion 140 and an output portion 150.

The capture portion 112 captures images of an object, and especially parallax images of the object. The capture portion 112 forms the image of the object on a light-receiving element such as a CCD (Charge Coupled Device) by means of at least one optic lens, so as to change the formed image into digital signals that are to be stored into a memory.

The process portion 120 calculates the depth information of the object based on the parallax images of the object taken by the capture portion 112, and generates the polygon model approximating the shape of the object.

The configuration and operation of the process portion 120 are the same as those in the second embodiment. The images taken by being two-dimensionally projected may correspond to the two-dimensional map. In this case, position coordinates of the image in pixel data correspond to the x- and y-coordinates, and therefore correspond to the x- and y-coordinates in the two-dimensional map. On the other hand, the z-axis that is perpendicular to the two-dimensional map corresponds to a direction from which the object is seen, being the depth direction of the object. Please note that in the initial state, the z-coordinate values of the lattice points in the two-dimensional map may be determined to correspond to the variation of the depth values of the object.

The recording portion 140 records the polygon model output from the process portion 120 onto a removable recording medium. The recording medium is a removable semiconductor memory such as a flash memory or a RAM, a magnetic recording medium such as a floppy disk or a mini-disk, or a similar medium.

The output portion 150 outputs the polygon model output from the process portion 120 as image data. In a case of displaying an image on a screen, for example, a liquid crystal display device that can display the image may be used as the output portion 150. The output portion 150 may display the image of the object captured by the capture portion 112.

As described above, the image capture apparatus in the present embodiment can capture the images of the object and obtain the depth information of the object so as to generate the polygon patches of the object simply and effectively, and can also display or record the polygon model of the object. According to the conventional image capture apparatus, even if the images of the object can be made, it is difficult to generate the polygon model of the object because there is no information regarding the depth of the object. On the other hand, the image capture apparatus in the present embodiment can obtain the depth information of the object, and therefore the three-dimensional polygon model of the object can be generated easily.

(Embodiment 5)

Figure 12:
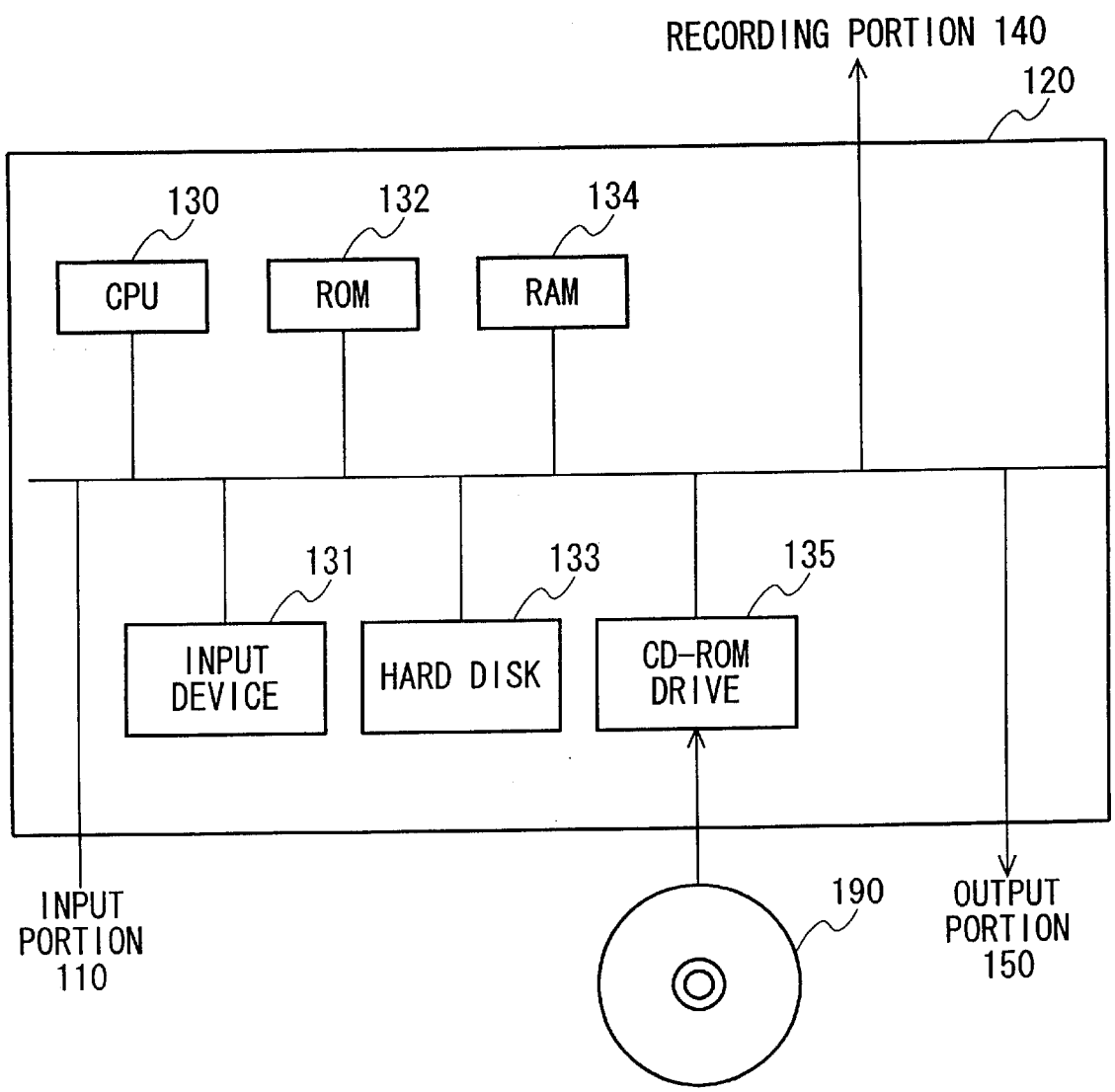
FIG. 12 is a block diagram schematically showing a structure of an image processing apparatus according to another embodiment of the present invention.

The fifth embodiment of the present invention is described in detail below. FIG. 12 is a block diagram schematically showing a structure of an image processing apparatus according to the fifth embodiment of the present invention. The basic structure and operation of the image processing apparatus are the same as those in the first, second and third embodiments. However, the present embodiment is different from the first, second and third embodiments in that a computer such as a personal computer or a workstation is used as the process portion 120 of the image processing apparatus.

Referring to FIG. 12, the hardware configuration of the process portion 120 in the present embodiment is described below. A CPU 130 operates based on a program stored in a ROM 132 and a RAM 134. Data is input by a user via an input device 131 such as a keyboard or a mouse. A hard disk 133 stores data such as images and programs for operating the CPU 130. A CD-ROM drive 135 reads data or a program from a CD-ROM 190 and provides the read data or program to at least one of the RAM 134, the hard disk 133 or the CPU 130.

The functional configuration of the software executed by the CPU 130 is the same as that of the process portion 120 of the image processing apparatus in the first, second and third embodiments, and includes an input point storage module, a lattice point set module, a lattice point storage module and a lattice point update module. The software may further include a depth calculation module.

Operations that the input point storage module, the lattice point set module, the lattice point storage module and the lattice point update module make the CPU 130 perform are the same as the functions and operations of the input point storage portion 14, the lattice point set portion 16, the lattice point storage portion 18 and the lattice point update portion 20 of the image processing apparatus in the first, second and third embodiments, therefore the description thereof is omitted. In a case where the software further includes the depth calculation module, an operation that this module makes the CPU 130 perform is the same as the function and operation of the depth calculation portion 12 of the process portion 120 in the second embodiment. The above-mentioned software is supplied to the user while being stored in a recording medium, for example, the CD-ROM 190. The software that is installed from the recording medium into the hard disk 133 is read into the RAM 134 and is then executed by the CPU 130.

The CD-ROM 190 as one example of the recording medium, can store a part or all of the functions and operations of the image processing apparatus described in the present application. The programs stored in the recording medium may be read directly into the RAM 134 for execution.

Other than the CD-ROM 190, an optical recording medium such as a DVD or a PD, a magnetic recording medium such as a floppy disk or a mini disk (MD), a magneto-optical recording medium such as an MO, a tape-like recording medium, or a nonvolatile semiconductor memory card can be used as the recording medium. The recording medium storing the aforementioned programs is used only for manufacturing the image processing apparatus of the present application, and therefore the manufacture, sale and the like of the recording medium as a business constitutes an infringement of a patent right based on the present application.

(Embodiment 6)

The sixth embodiment of the present invention is described in detail below. An image capture apparatus in the present embodiment is obtained by modifying the image processing apparatus shown in FIG. 12 to include the capture portion 112 in place of the input portion 110. The basic structure and operation of the image capture apparatus in the present embodiment is the same as that in the fourth embodiment. The image capture apparatus in the present embodiment is electronic equipment such as a portable computer having a camera or a PDA (personal digital assistant) having a camera. In this case, a computer part of the portable computer or the PDA mainly serves as the process portion 120.

The hardware configuration of the process portion 120 in the present embodiment is the same as that in the fifth embodiment and therefore the description thereof is omitted. The functional configuration of the software executed by the CPU 130 is the same as the functional configuration of the process portion 120 of the image capture apparatus in the fourth embodiment and therefore the description thereof is omitted.

As described above, according to the image processing apparatus in the first embodiment, the polygon model approximating the shape of the object using the polygon patches can be simply generated by using the self-organizing learning. Since the self-organizing learning has the effect of smoothing the data, the polygon model of the object can be generated without greatly being effected by noise or error, even if the image data of the object includes noise or the depth information is not precise.

According to the image processing apparatus in the second embodiment, the depth values of the object can be calculated from the parallax images of the object, from which the polygon model approximating the shape of the object can be generated. Therefore, even if there is no three-dimensional coordinate data of the object, the polygon model of the object can be generated from the parallax images.

According to the image processing apparatus in the third embodiment, after the polygon model of the object is generated and displayed on a screen, the polygon model can be modified or transformed. The polygon model approximating the object may include an unexpected error because of the adverse effect of noise or the precision of the updating algorithm. However, according to the image processing apparatus in the third embodiment, the user can modify or edit the polygon model so as to adjust the inappropriate part of the polygon model. In addition, the three-dimensional simulation of the object can be performed by rotating the polygon model or by extracting a part of the polygon model.

According to the image capture apparatus in the fourth embodiment, the polygon patches of the object can be generated simply and effectively by capturing the images of the object and obtaining the depth information regarding the depths of the object, there by the polygon model of the object can be displayed or recorded. According to the conventional image capture apparatus, it is difficult to generate the polygon model of the object because there is no information in the depth direction of the object even if a picture or image of the object is taken. On the other hand, the image capture apparatus in the fourth embodiment can obtain the depth information of the object and therefore can generate the three-dimensional polygon model of the object easily.

As is apparent from the above description, according to the present invention, the polygon model approximating the shape of the object using the polygon patches can be generated.

Although the present invention has been described by way of exemplary embodiments, it should be understood that many changes and substitutions may be made by those skilled in the art without departing from the spirit and the scope of the present invention which is defined only by the appended claims.

What is claimed is:

1. An image processing apparatus for generating a polygon model that approximates a shape of an object using a plurality of polygon patches, comprising:

an input portion for inputting three-dimensional coordinate data of the object as input points;

a storage portion for storing coordinate values of the input points input by the input portion;

an update portion for updating three-dimensional coordinate values of a plurality of lattice points of a polygon model to reflect a distribution density of the input points, the lattice points being initially arranged to form a plurality of lattices on a two-dimensional plane connected to each other to form a two-dimensional map such that, upon updating a range in which a vicinity of the lattice points exist becomes smaller, said input points being mapped into said two-dimensional map by which said lattice points adjacent to each of said input points converge in a determined manner toward said input points thereby providing a representation of said distribution density of said input points on said two-dimensional map; and an output portion for outputting, as the polygon patches of the polygon model, the updated three-dimensional coordinate values of the lattice points and a relationship of connections between the lattice points in the lattices.

2. An image processing apparatus according to claim 1, wherein the lattice points of the polygon model are arranged to form quadrangular lattices on the two-dimensional plane.

3. An image processing apparatus according to claim 2, wherein each of the quadrangular polygon patches is divided into two triangular polygon patches by setting a diagonal connecting two of four connected lattice points obtained by the update by the update portion, the two lattice points being not adjacent to each other.

4. An image processing apparatus according to claim 1, wherein the lattice points of the polygon model are arranged to form triangular lattices on the two-dimensional plane.

5. An image processing apparatus according to claim 1, wherein the output portion displays the polygon model based on the polygon patches, and wherein a manipulator is further provided for modifying and/or transforming the polygon model displayed by the output portion.

6. An image processing apparatus for generating a polygon model that approximates a shape of an object using a plurality of polygon patches, comprising:

an input portion for inputting three-dimensional coordinate data of the object as input points;

a storage portion for storing coordinate values of the input points input by the input portion;

an update portion for updating three-dimensional coordinate values of a plurality of lattice points of a polygon model to reflect a distribution density of the input points, the lattice points being initially arranged to form a plurality of lattices on a two-dimensional plane connected to each other to form a two-dimensional map such that, upon updating, said input points are mapped into said two-dimensional map thereby providing a representation of said distribution density of said input points on said two-dimensional map; and an output portion for outputting, as the polygon patches of the polygon model, the updated three-dimensional coordinate values of the lattice points and a relationship of connections between the lattice points in the lattices;

wherein the update portion updates the three-dimensional coordinate values of the plurality of lattice points of the polygon model one by one, for each of the input points stored in the storage portion; and wherein the update portion updates the three-dimensional coordinate values of the lattice points, by making a three-dimensional coordinate value of a closest lattice point and three-dimensional coordinate values of a plurality of vicinity lattice points closer to a three-dimensional coordinate value of each input point by a predetermined amount such that a range in which the vicinity lattice points exist becomes smaller, the closest lattice point being closer to said input point than any other lattice point in the three-dimensional coordinate system, the plurality of vicinity lattice points existing in the vicinity of the closest lattice point in the lattices on the two-dimensional plane.

7. An image processing apparatus according to claim 6, wherein said range in which the vicinity lattice points exist becomes smaller as a number of times the update is performed by the update portion increases.

8. An image processing apparatus according to claim 6, wherein the amount by which the three-dimensional coordinate value of each of the vicinity lattice points is updated becomes smaller as a distance from said vicinity lattice point to the closest lattice point increases.

9. An image capture apparatus for obtaining information regarding depths of an object and outputting a polygon model of the object, comprising:

a capture portion for capturing an image of the object;

a depth calculator for calculating the information regarding the depths of the object from the image captured by the capture portion, to output three-dimensional coordinate data of the object;

a storage portion for storing as coordinate values of input points the three-dimensional coordinate data output by the depth calculator;

an update portion for updating three-dimensional coordinate values of a plurality of lattice points of the polygon model to reflect a distribution density of the input points, the lattice points being initially arranged to form a plurality of lattices on a two-dimensional plane that are connected to each other to form a two-dimensional map such that, upon updating a range in which a vicinity of the lattice points exists becomes smaller, said input points being mapped into said two-dimensional map by which said lattice points adjacent to each of said input points converge in a determined manner toward said input points thereby providing a representation of said distribution density of said input points on said two-dimensional map; and an output portion for outputting as polygon patches of the polygon model the three-dimensional coordinate values of the lattice points updated by the update portion and a relationship of connections between the lattice points in the lattices.

10. An image capture apparatus according to claim 9, wherein a direction from which the object is seen is perpendicular to the two-dimensional plane on which the lattices are arranged.

11. An image capture apparatus according to claim 10, wherein values that are proximate to coordinate values of the input points in the direction from which the object is seen, respectively, are used as initial coordinate values in the direction perpendicular to the two-dimensional plane on which the lattices are arranged.

12. An image processing method for generating a polygon model that approximates a shape of an object by a plurality of polygon patches, comprising:

inputting three-dimensional data of the object as input points;

storing coordinate values of the input points;

updating three-dimensional coordinate values of a plurality of lattice points of the polygon model to reflect a distribution density of the input points, the lattice points being initially arranged to form a plurality of lattices on a two-dimensional plane that are connected to each other to form a two-dimensional map such that, upon updating a range in which a vicinity of the lattice points exist become smaller, said input points being mapped into said two-dimensional map by which said lattice points adjacent to each of said input points converge in a determined manner toward said input points thereby providing a representation of said distribution density of said input points on said two-dimensional map; and outputting as the polygon patches of the polygon model the updated three-dimensional coordinate values of the lattice points and a relationship of connections between the lattice points in the lattices.

13. An image processing method for generating a polygon model that approximates a shape of an object by a plurality of polygon patches, comprising:

inputting three-dimensional data of the object as input points;

storing coordinate values of the input points;

updating three-dimensional coordinate values of a plurality of lattice points of the polygon model to reflect a distribution density of the input points, the lattice points being initially arranged to form a plurality of lattices on a two-dimensional plane that are connected to each other to form a two-dimensional map such that, upon updating, said input points are mapped into said two-dimensional map thereby providing a representation of said distribution density of said input points on said two-dimensional map; and outputting as the polygon patches of the polygon model the updated three-dimensional coordinate values of the lattice points and a relationship of connections between the lattice points in the lattices;

wherein the three-dimensional coordinate values of the lattice points are updated one by one by making a three-dimensional coordinate value of a closest lattice point and three-dimensional coordinate values of a plurality of vicinity lattice points closer to a three-dimensional coordinate value of each of the input points by a predetermined amount such that a range in which the vicinity lattice points exist becomes smaller, the closest lattice point being the closest one of the lattice points to said input point in a three-dimensional system, the vicinity lattice points being the lattice points that exist in the vicinity of the closest lattice point in the lattices on the two-dimensional plane.

14. A computer-readable recording medium storing a program for generating a polygon model that approximates a shape of an object using a plurality of polygon patches, the program comprising:

an input model for making three-dimensional coordinate data of an object be input as input points;

a storage module for making values of the input points input by the input module being stored;

an update module for updating three-dimensional coordinate values of a plurality of lattice points of the polygon model to reflect a distribution density of the input points, the lattice points being initially arranged to form a plurality of lattices on a two-dimensional plane to form a two-dimensional map such that, upon updating a range in which a vicinity of the lattice points exist becomes smaller, said input points being mapped into said two-dimensional map by which said lattice points adjacent to each of said input points converge in a determined manner toward said input points thereby providing a representation of said distribution density of said input points on said two-dimensional map; and an output module for outputting the three-dimensional coordinate values of the lattice points updated by the update module and a relationship of connections between the lattice points in the lattices as the polygon patches of the polygon model.

* * * * *